United States Patent
Meaney et al.

(10) Patent No.: US 8,843,806 B2
(45) Date of Patent: Sep. 23, 2014

(54) DYNAMIC GRADUATED MEMORY DEVICE PROTECTION IN REDUNDANT ARRAY OF INDEPENDENT MEMORY (RAIM) SYSTEMS

(75) Inventors: Patrick J. Meaney, Poughkeepsie, NY (US); William J. Clarke, Poughkeepsie, NY (US); Eldee Stephens, Waterbury, CT (US); Judy S. Johnson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/353,879

(22) Filed: Jan. 19, 2012

(65) Prior Publication Data
US 2013/0191703 A1    Jul. 25, 2013

(51) Int. Cl.
*G11C 29/00* (2006.01)
(52) U.S. Cl.
USPC .......................................... 714/770; 714/6.12
(58) Field of Classification Search
CPC ................................................. G06F 11/1076
USPC ................................. 714/770, 6.12
See application file for complete search history.

(56) References Cited

U.S. PATENT DOCUMENTS

| | | | |
|---|---|---|---|
| 5,537,104 A | 7/1996 | Van Dort et al. | |
| 5,864,752 A | 1/1999 | Pinder | |
| 5,998,868 A | 12/1999 | Pogge et al. | |
| 6,154,400 A | 11/2000 | Wang et al. | |
| 6,282,686 B1 | 8/2001 | Cypher | |
| 6,397,365 B1 * | 5/2002 | Brewer et al. | 714/766 |
| 7,096,407 B2 * | 8/2006 | Olarig | 714/768 |
| 7,155,568 B2 * | 12/2006 | Richard et al. | 711/114 |
| 7,200,770 B2 | 4/2007 | Hartwell et al. | |
| 7,320,086 B2 * | 1/2008 | Majni et al. | 714/5.1 |
| 7,509,419 B2 | 3/2009 | Elnozahy et al. | |

(Continued)

FOREIGN PATENT DOCUMENTS

| | | |
|---|---|---|
| JP | 2000002664 A | 1/2000 |
| JP | 2004047542 A | 12/2004 |

OTHER PUBLICATIONS

C. Jeffery et al.; "Dynamic Sparing and Error Correction Techniques for Fault Tolerance in Nanoscale Memory Structures"; Nanotechnology 2004; 4th IEEE Conference on Digital Object Identifier; 10.1109/NANO.2004.1392285; Publication Year 2004; pp. 168-170.

(Continued)

*Primary Examiner* — Esaw Abraham
(74) *Attorney, Agent, or Firm* — Cantor Colburn LLP; Margaret McNamara

(57) ABSTRACT

Dynamic graduated memory device protection in redundant array of independent memory (RAIM) systems that include a plurality of memory devices is provided. A first severity level of a first failing memory device in the plurality of memory devices is determined. The first failing memory device is associated with an identifier used to communicate a location of the first failing memory device to an error correction code (ECC). A second severity level of a second failing memory device in the plurality of memory devices is determined. It is determined that the second severity level is higher than the first severity level. The identifier from the first failing memory device is removed based on determining that the second severity level is higher than the first severity level. The identifier is applied to the second failing memory device based on determining that the second severity level is higher than the first severity level.

13 Claims, 5 Drawing Sheets

(56) References Cited

U.S. PATENT DOCUMENTS

| | | | |
|---|---|---|---|
| 7,757,123 B1* | 7/2010 | Gasser et al. | 714/27 |
| 7,890,811 B2 | 2/2011 | Rothman et al. | |
| 8,225,036 B2 | 7/2012 | Koga | |
| 8,266,501 B2 | 9/2012 | Jeddeloh | |
| 8,327,225 B2* | 12/2012 | Jeddeloh | 714/763 |
| 8,484,529 B2 | 7/2013 | Alves et al. | |
| 2004/0168101 A1* | 8/2004 | Kubo | 714/6 |
| 2007/0114652 A1 | 5/2007 | Hsieh | |
| 2009/0000995 A1 | 1/2009 | Yanai | |
| 2009/0006900 A1 | 1/2009 | Lastras-Montano et al. | |
| 2009/0031078 A1 | 1/2009 | Warnes et al. | |
| 2009/0164837 A1 | 6/2009 | Swanson et al. | |
| 2010/0005218 A1 | 1/2010 | Gower et al. | |
| 2010/0162037 A1 | 6/2010 | Maule et al. | |
| 2010/0199017 A1 | 8/2010 | Hollis | |
| 2010/0293436 A1 | 11/2010 | Coteus et al. | |
| 2010/0293438 A1 | 11/2010 | Lastras-Montano et al. | |
| 2012/0311406 A1 | 12/2012 | Ratnam et al. | |
| 2013/0191698 A1 | 7/2013 | Meaney et al. | |

OTHER PUBLICATIONS

Casey Jeffery et al; "Hierarchical Fault Tolerance for Nanoscale Memories"; Nanotechnology, IEEE Transaction on vol. 5; Issue 4; Digital Object Identifier; 10.1109/TNANO.2006.877431; Publication Year 2006; pp. 407-414.

Girish Venkatasubramanian et al.; "Design of High Yield Defect Tolerant Self-Assembled Nanoscale Memories"; Nanoscale Architectures 2007; NANOSARCH 2007; IEEE International Symposium on Digital Object Identifier 10.1109/NANOARCH.2007.4400861; Publication Year 2007; pp. 77-84.

Ip.com Electronic Publication No. IPCOM000127931D; Author: Wawrzynek, J. Title: "Memory Management in the Programming Language ICL"; www.ip.com/ipcom000127931D/; California Institute of Tecnhnology—Original Publication Date: Dec. 31, 1983.

On Chip Error Correcting Techniques for New Generation Flash Memories; Proceedings of the IEEE vol. 91; No. 4; Apr. 2003; pp. 602-616.

U.S. Appl. No. 13/353,925; Non Final Office Action; Date Filed Jan. 19, 2012; Date Mailed: Sep. 26, 2013; pp. 1-14.

U.S. Appl. No. 13,353,814; Non Final Office Action; Date Filed: Jan. 19, 2012; Date Mailed: Nov. 21, 2013; pp. 1-22.

U.S. Appl. No. 13,353,814; Notice of Allowance; Date Filed: Jan. 19, 2012; Date Mailed: Mar. 18, 2014; pp. 1-9.

U.S. Appl. No. 13,353,925; Notice of Allowance; Date Filed: Jan. 19, 2012; Date Mailed: Mar. 7, 2014; pp. 1-13.

Non-Final Office Action Mail date Feb. 12, 2014 for U.S. Appl. No. 14/102,579, filed Dec. 11, 2013; pp. 1-22.

* cited by examiner

DYNAMIC GRADUATED MEMORY DEVICE PROTECTION IN REDUNDANT ARRAY OF INDEPENDENT MEMORY (RAIM) SYSTEMS

BACKGROUND

The present invention relates generally to computer memory, and more specifically, to memory device protection in redundant array of independent memory (RAIM) systems.

Memory device densities have continued to grow as computer systems have become more powerful. With the increase in density comes an increased probability of encountering a memory failure during normal system operations. Techniques to detect and correct bit errors have evolved into an elaborate science over the past several decades. Perhaps the most basic detection technique is the generation of odd or even parity where the number of 1's or 0's in a data word are "exclusive or-ed" (XOR-ed) together to produce a parity bit. If there is a single error present in the data word during a read operation, it can be detected by regenerating parity from the data and then checking to see that it matches the stored (originally generated) parity.

Richard Hamming recognized that the parity technique could be extended to not only detect errors, but to also correct errors by appending an XOR field, an error correction code (ECC) field, to each data, or code, word. The ECC field is a combination of different bits in the word XOR-ed together so that some number of errors can be detected, pinpointed, and corrected. The number of errors that can be detected, pinpointed, and corrected is related to the length of the ECC field appended to the data word. ECC techniques have been used to improve availability of storage systems by correcting memory device (e.g., dynamic random access memory or "DRAM") failures so that customers do not experience data loss or data integrity issues due to failure of a memory device.

Redundant array of independent memory (RAIM) systems have been developed to improve performance and to increase the availability of storage systems. RAIM distributes data across several independent memory modules (each memory module contains one or more memory devices). There are many different RAIM schemes that have been developed each having different characteristics, and different pros and cons associated with them. Performance, availability, and utilization/efficiency (the percentage of the disks that actually hold customer data) are perhaps the most important. The tradeoffs associated with various schemes have to be carefully considered because improvements in one attribute can often result in reductions in another.

SUMMARY

An embodiment is a memory system for providing dynamic graduated chip protection. The memory system includes a plurality of memory devices and is configured to perform a method that includes determining a first severity level of a first failing memory device in the plurality of memory devices. The first failing memory device is associated with an identifier used to communicate a location of the first failing memory device to an error correction code (ECC). A second severity level of a second failing memory device in the plurality of memory devices is determined. It is determined that the second severity level is higher than the first severity level. The identifier from the first failing memory device is removed based on determining that the second severity level is higher than the first severity level. The identifier is applied to the second failing memory device based on determining that the second severity level is higher than the first severity level.

Other embodiments include a method and computer program product for providing dynamic graduated chip protection in a memory system. A first severity level of a first failing memory device is determined. The first failing memory device is one of a plurality of memory devices in the memory system and is associated with an identifier used to communicate a location of the first failing memory device to an error correction code (ECC). A second severity level of a second failing memory device in the plurality of memory devices is determined. It is determined that the second severity level is higher than the first severity level. The identifier from the first failing memory device is removed based on determining that the second severity level is higher than the first severity level. The identifier is applied to the second failing memory device based on determining that the second severity level is higher than the first severity level.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
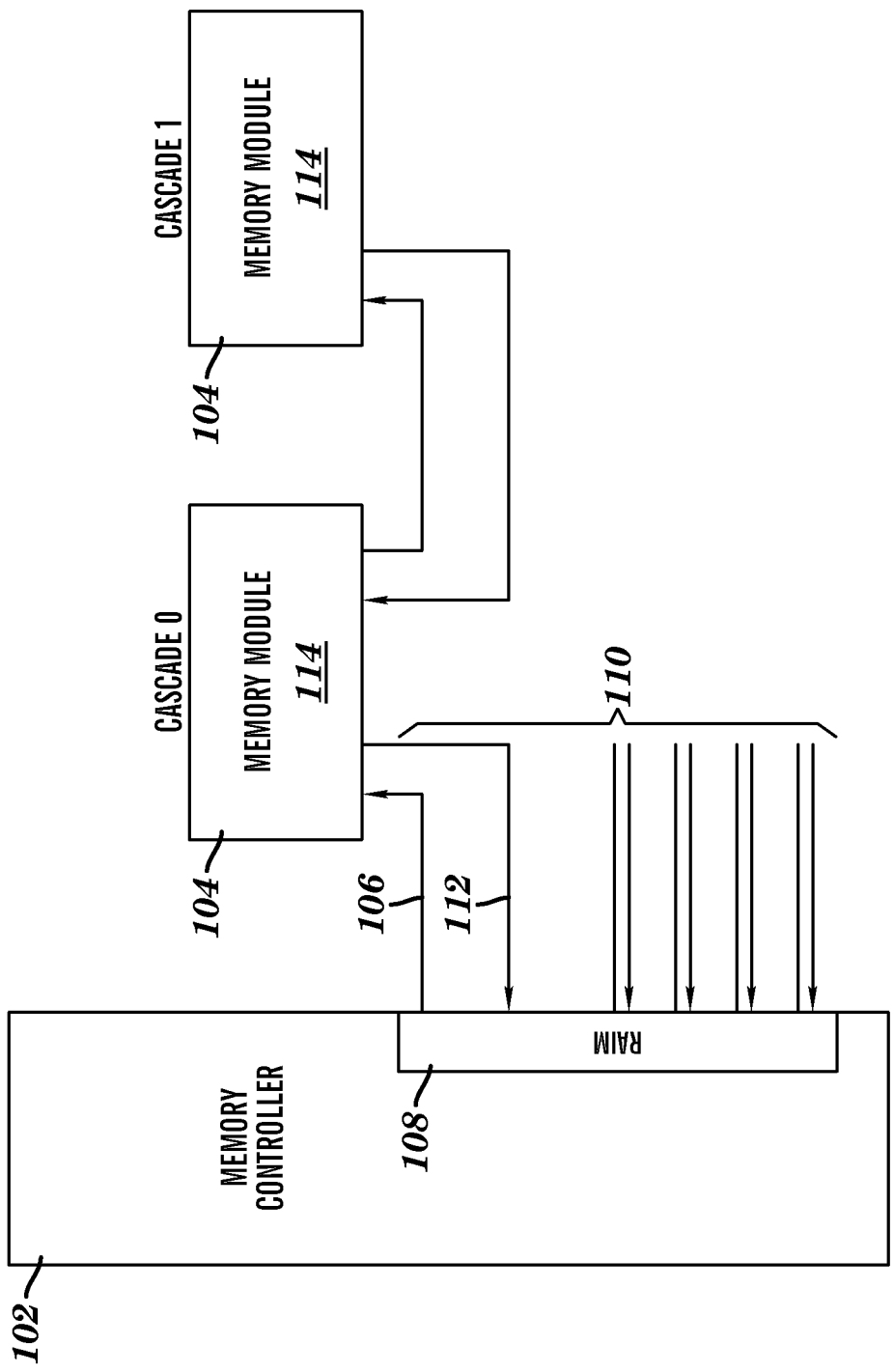
FIG. 1 illustrates a block diagram of a cascade interconnect memory system in accordance with an embodiment.

Exemplary embodiments of the present invention provide dynamic, graduated chip marking in redundant array of independent memory (RAIM) error correction code (ECC) systems. Rather than waiting until there are chip kills before implementing chip marking, embodiments proactively use chip marks to protect against possible failures caused by memory devices with less severe errors. As used herein, the term "chip kill" refers to a chip that has a defect level above which it is safe to keep using that chip. An embodiment includes marking memory devices based on a severity of detected address errors using a graduated chip marking scheme that gives higher priority to memory devices with more extreme errors, while allowing previously unused chip marks to be used for less extreme, known memory device errors. The ability to dynamically move chip marks between memory devices in a rank, based on an observed error level in the memory devices allows all available chip marks to be utilized for error correction at any given point in time, and thus, stronger error correction capabilities in the memory system.

In accordance with exemplary embodiments, memory scrubbing is performed on memory devices in a memory system to determine the presence of any address locations within the memory devices that are failing (referred to herein as "defective addresses"). A count of the number of defective addresses is accumulated for all memory devices within a rank. Chip marks are used to "spare out" memory devices (e.g., dynamic random access memory devices or "DRAM devices") in the rank that have high error counts. If there are more chip marks left once memory devices exhibiting high error counts have been marked, then memory devices with lower error counts can also be marked. If a memory device having a higher error count is subsequently detected in the rank, then the chip mark associated with the memory device having the lower error count is changed to protect the memory device in the rank having the higher error count.

Marking a memory device with a chip mark allows the ECC to ignore all contributing errors associated with the marked device.

Contemporary RAIM systems have two DRAM device chip marks which can be applied on a per-rank basis to guard against bad memory devices that have severe defects. Typically, the presence of thirty-two unique address errors in a memory device [e.g., for a 2 gigabit, ×8 memory DRAM with 8 banks, 2^15 row addresses and 2^10 column addresses] results in a classification referred to herein as a "chip kill status" and the memory devices (up to two in contemporary systems) are marked. In contemporary systems, the chip marking is assigned within a rank. Contemporary memory systems may contain DRAM devices having some address errors but not enough errors to qualify for a chip kill status. These DRAM devices are not marked because marking them would not allow for future DRAM devices that qualify for a chip kill status to be marked. However, by not marking these DRAM devices that do not qualify for a chip kill status, if a chip kill on a memory device is detected in the same rank but in a different channel, it is possible for the new DRAM device data to line up with the unmarked DRAM device that has some errors, thus causing uncorrectable errors (UEs). One solution is to allow a lower threshold for chip marking, but because the chip marks cannot be moved once they are applied to a memory device (at least not until the memory device is replaced or the channel containing the memory device is marked), this may cause the chip marks to be used up too soon and may cause memory devices to be replaced unnecessarily.

In an embodiment of the present invention described herein, there are at least three programmable categories or severity levels related to the number of defective addresses in a memory device: soft errors—less than a first low threshold of defective addresses (e.g., less than four defective addresses); hard errors—equal to or more than the first low threshold of defective address and less than a second medium threshold of defective addresses (e.g., greater than or equal to four, and less than thirty-two defective addresses); and chip kill—equal to or more than the second medium threshold of defective addresses (e.g., greater than or equal to thirty-two defective addresses). First, chip marks are used to mark memory devices which fall into the chip kill category, these are the memory devices which have high error counts. If there are additional chip marks left over after chip marks are placed on any memory devices that fall into the chip kill category, a memory device(s) in the hard errors category (e.g., the memory device with the next highest number of defective addresses over the first threshold) is also chip marked. If it is determined at a later time that another memory device falls into the chip kill category, then the chip mark associated with the memory device having a hard error status may be swapped over to be used for the memory device having a chip kill status.

The number of categories and the threshold values described above are just examples and other implementations are also possible in accordance with embodiments. For example, the number of categories and threshold values may vary based on implementation and/or application requirements. In addition, the threshold may be based on the actual number of unique failing addresses in the memory devices (e.g., sixteen, sixty-four, one-hundred and twenty-eight defective addresses, etc.).

In an embodiment, once a chip mark is assigned to a memory device that is at the chip kill level, it cannot be moved until the memory device is replaced. In another embodiment, once a chip mark is assigned to a memory device that is at the chip kill level, the chip mark can be moved and reused by a memory device on another channel if the channel where the memory device is located is marked with a channel mark. In a further embodiment, the chip mark is assigned based on the number of unique address errors identified in the latest memory scrub processes and the chip marks are moved after each scrub (or on some other periodic basis) to the memory devices having the highest number of address errors.

In an embodiment ECC code supports chip marking of up to memory devices per rank.

FIG. 1 illustrates a block diagram of a cascade interconnect memory system that may be implemented by an embodiment. The memory system depicted in FIG. 1 includes multiple independent memory interface busses 110 that are logically aggregated together to operate in unison to support a single independent access request from a memory controller 102. The servicing of the single independent access request includes data and error detection/correction information distributed or "striped" across the memory interface busses 110 and associated memory devices located on the memory modules 104 by a RAIM module 108. The RAIM module 108 coordinates the striping of data and ECC across each of the parallel memory interface buses 110. An embodiment also includes CRC error detection being performed on data being transferred on the memory interface busses 110 between the memory controller 102 and the memory modules 104.

As shown in the embodiment depicted in FIG. 1, the memory controller 102 attaches to five narrow/high speed point-to-point memory interface busses 110, with each of the memory interface buses 110 connecting one of five memory controller interface channels to a cascade interconnect memory module 104 (or memory subsystem). In an embodiment, each memory module 104 includes at least one hub device 114 and one or more memory devices. In another embodiment, there is a hub device that is outside the actual memory module 104 (as would be the case with so-called industry standard DIMMs). As depicted in FIG. 1, the memory interface busses 110 operate in unison to support an access request from the memory controller. In an exemplary embodiment, there may exist a multiplicity of outstanding fetch and store requests to the multiple cascades in the memory subsystem.

Each of the memory interface buses 110 in the embodiment depicted in FIG. 1 includes an upstream bus 112 and a downstream bus 106. One of the functions provided by the memory modules 104 (e.g., a hub device 114 located on the memory module 104) is a re-drive function to send signals on the upstream bus 112 to the memory controller 102 or on the downstream bus 106 to other memory modules 104. In an embodiment, up to two memory modules 104 are cascade connected to each of the memory interface buses 110. In an embodiment, the memory interface buses 110 are implemented using differential clock and data signals (i.e., each clock and data signal requires two wires). In an embodiment, the downstream bus 106 includes thirty-two wires to support: one clock signal, thirteen data/command signals (or bits), one general purpose spare lane (which can be used to spare a clock or a data/command signal), and one spare data/command lane. In this embodiment, each data packet is transferred over the downstream bus 106 in twelve beats and includes eighteen CRC bits. In an exemplary embodiment, the upstream bus 112 includes forty-six wires to support: one clock signal, twenty data/command signals, one general purpose spare lane (which can be used to spare a clock or a data/command signal), and one spare data/command lane. In this embodiment, each data packet is transferred over the upstream bus 112 in eight beats and includes sixteen CRC bits.

As used herein, the term "RAIM" refers to redundant array of independent memory modules (e.g., dual in-line memory modules or "DIMMs). In a RAIM system, if one of the memory channels fails (e.g., a memory module in the channel), the redundancy allows the memory system to use data from one or more of the other memory channels to reconstruct the data stored on the memory module(s) in the failing channel. The reconstruction is also referred to as error correction.

In an embodiment, the memory system depicted in FIG. 1 is a RAIM memory system and the five channels are lock step channels (i.e., the five memory interface buses 110 are accessed in unison with each other). The RAIM module 108 in this implementation has the property that one of the channel's data is the bitwise XOR of the other four channel's data. Additional checks are included in order to correct for additional errors. As used herein, the term "mark" refers to an indication given to an ECC that a particular symbol or set of symbols of a read word are suspected to be faulty. The ECC can then use this information to enhance its error correction properties.

As used herein, the term "correctable error" or "CE" refers to an error that can be corrected while the system is operational, and thus a CE does not cause a system outage. As used herein, the term "uncorrectable error" or "UE" refers to an error that cannot be corrected while the memory system is operational, and thus presence of a UE may cause a system outage or job abends/restarts, during which time the cause of the UE can be corrected (e.g., by replacing a memory device, by replacing a memory module, recalibrating an interface, taking defective memory locations offline).

As used herein, the term "coincident" refers to the occurrence of two (or more) error patterns or error conditions that overlap each other in time. In one example, a CE occurs and then later in time, before the first CE can be repaired, a second failure occurs. The first and second failure are said to be coincident. Repair times are always greater than zero and the longer the repair time, the more likely it would be to have a second failure occur coincident with the first.

Figure 2:
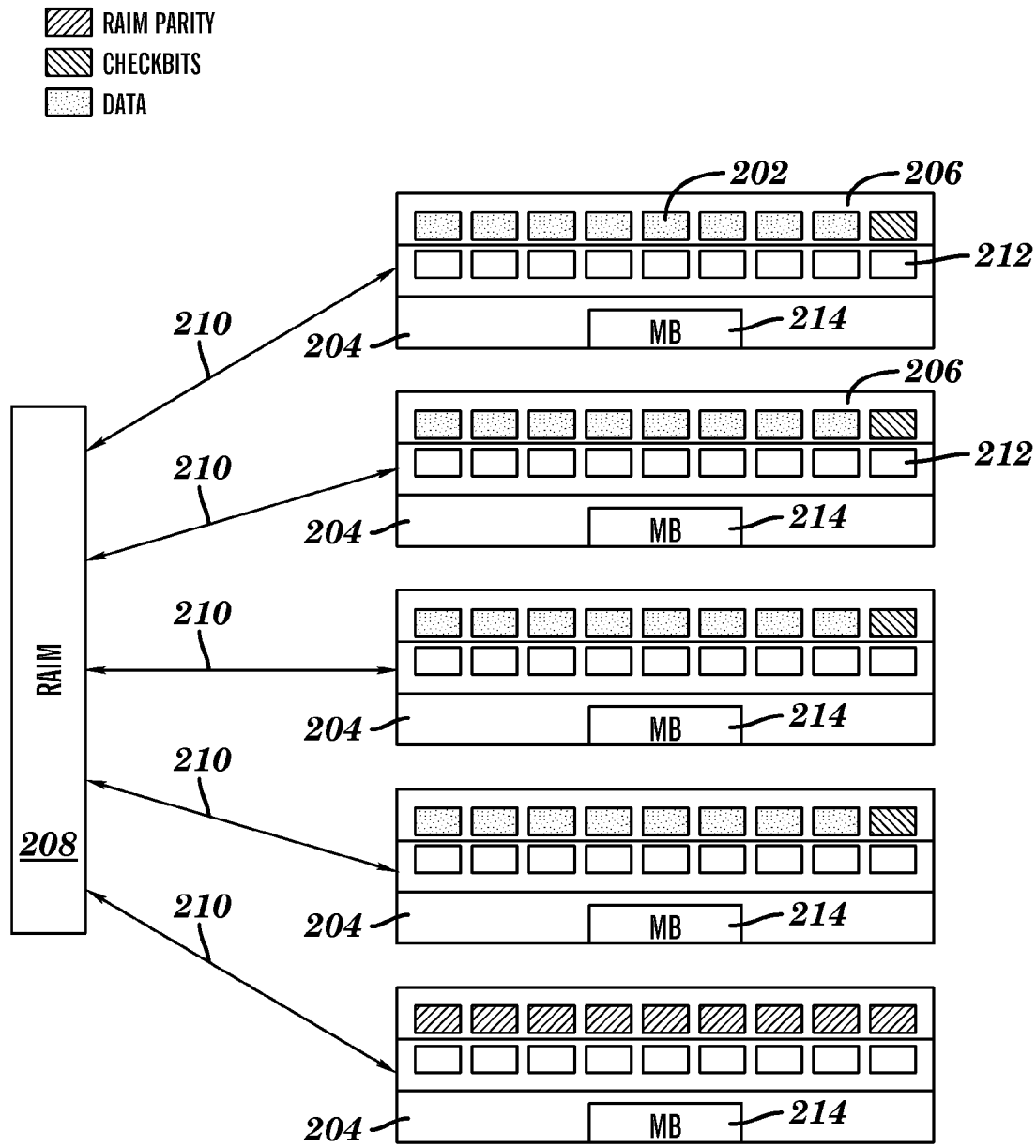
FIG. 2 illustrates a memory system in accordance with an embodiment.

FIG. 2 illustrates a memory system in accordance with an embodiment. The memory system includes a RAIM controller 208 that is in communication with five DIMMs 204 via memory interface buses 210. Each DIMM 204 includes a memory buffer device 214 as well as two ranks 206 212 of memory devices 202. In this example, a first rank 206 includes nine memory devices 202 and a second rank 212 includes nine memory devices 202. As shown in FIG. 2, the first rank 202 on one of the DIMMs 204 includes RAIM parity data, and one memory device 202 from the first rank 202 on each of the each of the other four channels includes checkbits. The parity data and check bits are used for CRC and ECC as is known in the art.

Embodiments described herein are not limited to the memory system configurations shown in FIG. 1 and FIG. 2. Embodiments may be implemented on any memory system configurations known in the art. Another memory system configuration where embodiments may be implemented includes a memory system with DIMMs that have a planar hub chip.

Figure 3:
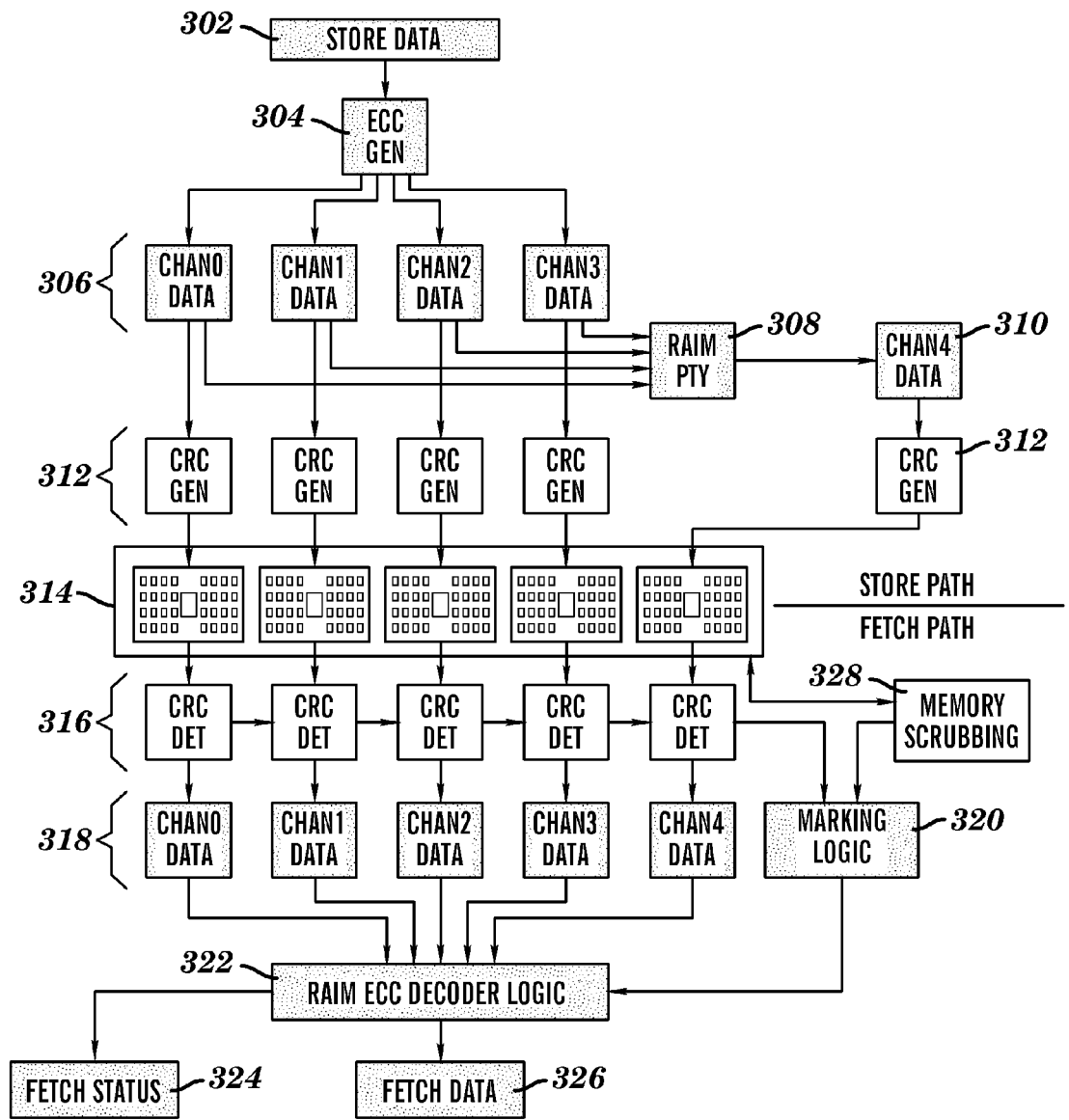
FIG. 3 illustrates a block diagram of a redundant array of independent memory (RAIM) store and fetch path that implements both error correction code (ECC) and cyclical redundancy code (CRC) in accordance with an embodiment.

FIG. 3 illustrates a block diagram of RAIM store and fetch paths that implement both ECC and channel CRC in an embodiment. In an embodiment, the store path is implemented by hardware and/or software located on the memory controller 102. In addition, the store path may be implemented by hardware and/or software instructions located on a memory module 104 (e.g., in a hub device on the memory module). The RAIM configuration depicted in FIG. 3, which includes a memory channel that is dedicated to storing parity information, has some similarities to a RAID 3 configuration (i.e., striped disks with dedicated parity), although as described earlier in reference to FIG. 1, a RAIM ECC code may be implemented that includes additional checks that are stored that allow for functionality well beyond the RAID 3 capabilities. As depicted in FIG. 3, data from the five channels are combined in a way that protects data against loss of any one memory channel (e.g., a memory module 104).

In the RAIM store path depicted in FIG. 3, the ECC generator 304 receives store data 302 and outputs four groupings of channel data 306 that include ECC checkbits. The channel data 306 are input to individual CRC generators 312 and are also input to a RAIM parity generator 308 that outputs RAIM parity bits as channel data 310. The combination of the ECC checkbits and the RAIM parity bits described above are the overall checkbits of the RAIM ECC. The channel data 306 310 are input to the CRC generators 312 to generate CRC bits for the channel data 306 and 310. Output from the CRC generators 312 (including CRC and data bits) are then output to the downstream bus 106 (or channel) for transmission to the memory modules 314. As shown in FIG. 3, the data being stored on the memory modules 314 are supplemented by ECC. In an embodiment, the CRC bits are used for bus protection and are not stored.

In an embodiment, the fetch path is implemented by hardware and/or software located on the memory controller 102. In addition, the fetch path may be implemented by hardware and/or software instructions located on a memory module 104 (e.g., in a hub device on the memory module). As shown in FIG. 3, the RAIM fetch path includes receiving data on an upstream bus 112 from the memory modules 314. The CRC detectors 316 depicted in FIG. 3 are utilized to detect a channel error, and to temporarily mark a failing channel. Output from the CRC detectors 316 are the channel data 318, which include data and ECC bits that were generated by an ECC generator, such as ECC generator 304. In addition, the CRC detectors 316 output data to the marking logic 320 (also referred to herein as a "marking module") to indicate which channels are in error.

In an embodiment the marking logic 320 generates marking data indicating which channels and memory chips (i.e. devices) are marked. In an embodiment, the marking logic stores a vector of data indicating which, if any of the memory devices in the given rank have been marked. In an embodiment, the marking logic 320 receives data from a memory scrubbing process 328. The memory scrubbing process 328 is executed on a periodic basis to verify the integrity of the data in the memory devices located on the memory modules 314.

In one embodiment, the output from the memory scrubbing process 328 is stored in a table and accessed by the marking logic. In an embodiment, each memory device 314 within the rank is categorized as described earlier, e.g., as having a chip-kill, hard error or soft error status. These categories are programmable and may be stored in hardware table and/or as software instructions. In an embodiment, a two bit code is also stored along with a location of each of the marks to indicate a status of the memory device where the chip mark is currently located. This status will be used to determine whether the mark should be moved. In other embodiments, a pointer is stored to the table generated by the memory scrubbing process that indicates a number of address errors in the memory device having the chip mark. In these other embodiments, the number of address errors in the memory device having the chip mark will be used to determine whether the mark should be reassigned to another chip.

The channel data 318 and the marking data are input to RAIM module 322 where channel data 318 are analyzed for errors which may be detected and corrected using the RAIM ECC and the marking data received from the marking logic 320. Output from the RAIM module 322 are the corrected data 326 (in this example 64 bytes of fetched data) and a fetch status 324. Embodiments provide the ability to have soft errors present (e.g., failing memory devices) and also channel failures or other internal errors without getting UEs.

Further descriptions of chip and channel marking may be found, for example, in U.S. patent application Ser. No. 12/822,469 titled "RAIM System Using Decoding of Virtual ECC", filed on Jun. 24, 2010, the contents of which are hereby incorporated by reference in its entirety. Further descriptions of chip and channel marking may also be found, for example, in U.S. patent application Ser. No. 12/822,503 titled "Error Correction and Detection in a Redundant Memory System", filed on Jun. 24, 2010, the contents of which are hereby incorporated by reference in its entirety.

Figure 4:
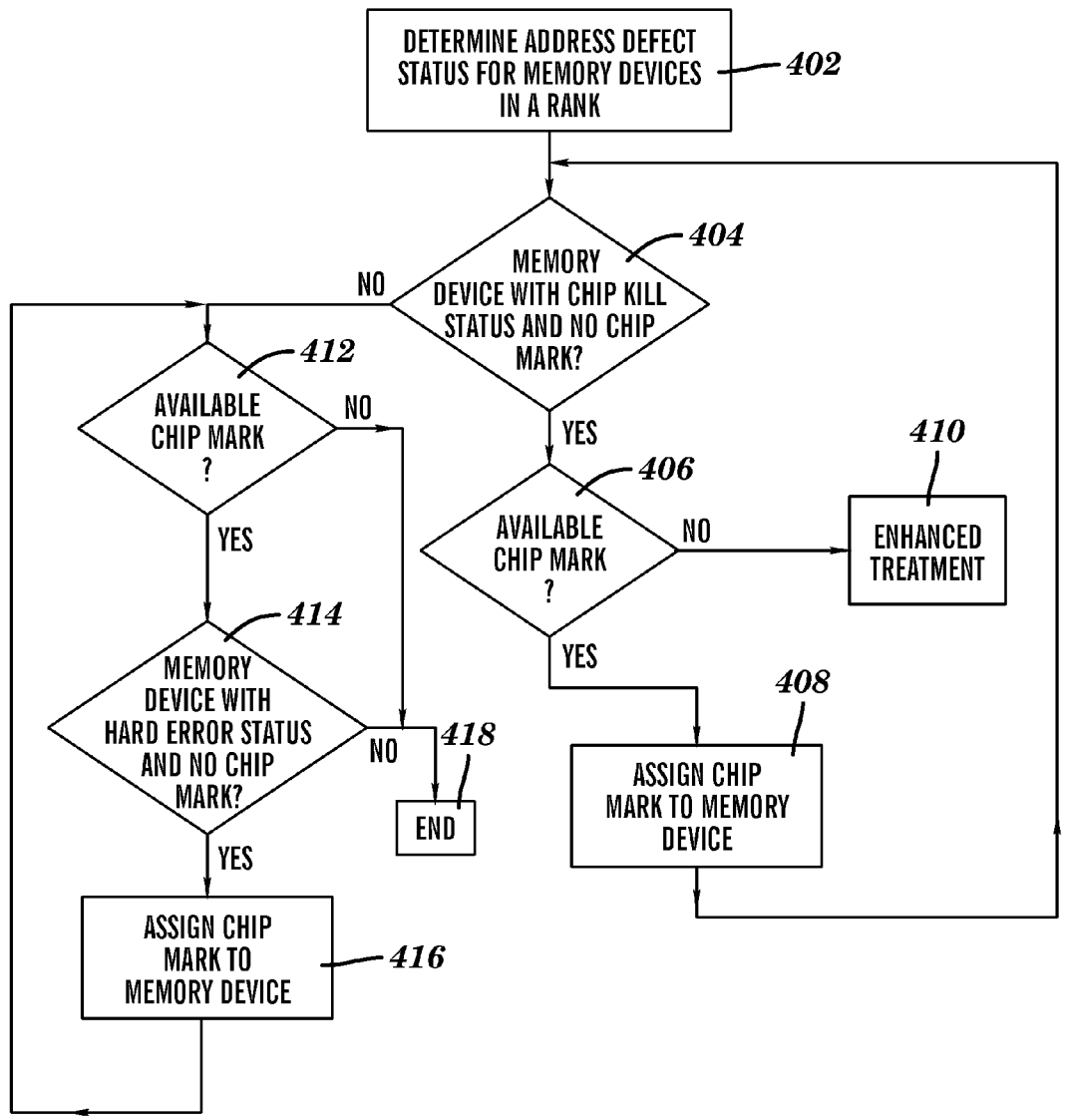
FIG. 4 illustrates a process flow for performing graduated chip marking in accordance with an embodiment.

FIG. 4 illustrates a process flow for performing graduated chip marking in accordance with an embodiment. In an embodiment, the process flow of FIG. 4 is implemented by software and/or hardware located in the marking logic 320 shown in FIG. 3. In another embodiment, the process flow of FIG. 4 is implemented in software. The process flow shown in FIG. 4 is referred to herein as a "dynamic process" because it may be performed, periodically or continuously, during normal system operation, as part of the self-diagnostics of the machine, i.e., while memory accesses are being performed by production applications. The process flow can also be performed during the initialization/boot of the machine or after a machine goes down and needs to be diagnosed and brought back up.

Referring to FIG. 4, at block 402, an address defect status is determined for memory devices within a rank. As described previously, data from the memory scrubbing process 328 may be used to determine an address defect status for the memory devices. Alternatively, or in addition, a faulty chip may be detected when the memory controller or RAIM logic polls a hub in a memory module. Polling is a process in which the hardware and/or software can read error statuses from a memory controller or hub hardware. In an embodiment, the polling is done in a running system via mainline, inband connections or via out-of-band control packet transfers. In an embodiment, calibration data is read from the hub chip by software using hardware polling. At block 402, each memory device 314 within the rank is categorized as described earlier, e.g., as having a chip-kill, hard error or soft error status.

At block 404, it is determined if there is a memory device with a status of chip kill that is currently not marked with a chip mark. The chip mark is an identifier that is used to communication a location of a failing memory device to the ECC. If this is the case, then processing continues at block 406 to determine if there is an available chip mark. In an embodiment, an available chip mark is one that is currently not marking any memory device or one that is currently marking a memory device that has a lower defect status than chip kill (in this example, a status of hard error). If there is an available chip mark, then processing continues at block 408 and the available chip mark is assigned (or applied) to the memory device. If the available chip mark was previously associated with a memory device having a lower status, then the chip mark is also removed from the memory device having the lower status. Processing then continues at block 404. If it is determined, at block 406, that there is not an available chip mark, the processing continues at block 410 where an enhanced treatment, such as channel marking logic is invoked. An example of channel marking logic that may be implemented at block 410 is found in U.S. patent application Ser. No. 12/981,017 titled "Channel Marking for Chip Mark Overflow and Calibration Errors", filed on Dec. 29, 2010, the contents of which are hereby incorporated by reference in its entirety. In an embodiment, the channel marking logic at block 410 may issue an alert (e.g., issues a "call home") indicating that the number of available chip marks has been exceeded.

If it is determined, at block 404, that there are no memory devices with a status of chip kill that are currently not marked with a chip mark, then processing continues at block 412. At block 412, it is determined if there is an available chip mark. In an embodiment, an available chip mark is one that is currently not marking any real memory device. In another embodiment, an available chip mark is one that is either not marking any real memory devices or one that is marking a memory device that is in a category with a lower severity level (e.g. soft). If there is an available chip mark, then processing continues at block 414 to determine if there is a memory device with a status of hard errors that is currently not marked with a chip mark. If this is the case, then block 416 is performed to assign, or to apply, a chip mark to the memory device and processing then continues at block 412. If there are no more available chip marks, as determined at block 412, then processing ends at block, 418. Similarly, if there are no memory devices with a status of hard error that are currently not marked with a chip mark, the processing ends at block 418.

Embodiments have been described herein in terms of chip marking, however those skilled in the art will appreciate that embodiments are applicable to other forms of memory device protection. Another type of memory device protection that embodiments described herein may be applied to is memory device sparing. An exemplary system for implementing memory device sparing in accordance with embodiments is a memory system with memory devices "A", "B", "C", "S1", and "S2". In one scenario, hard errors not rising to a level of chip kill are first detected in memory device "A" and in response, memory device "S1" is assigned as a spare memory device for memory device "A". To provide the sparing, an identifier specifying the location of memory device "S1" is associated with memory device "A", and contents of memory device "A" are copied over to memory device "S1". In an embodiment, memory device "A" continues to be written to along with memory device "S1" when a write command is directed to memory device "A" (this is a typical practice in the art). In this manner, both the spare memory device "S1" and memory device "A" are written to in order to service a request to write data to memory device "A". Also as a part of the sparing, when a read is directed to memory device "A", memory device "S1" is read. In this manner, the spare memory device "S1" is used in place of memory device "A" to service a read request to read data from memory device "A".

Next, in this scenario, a chip kill is detected in memory device "B" and memory device "S2" is used as a spare memory device for memory device "B". To provide the sparing, an identifier specifying the location of memory device "S2" is associated with memory device "B", and contents of memory device "B" are copied over to memory device "S2". Next, in this scenario, a chip kill is detected in memory device "C". In this embodiment, where a chip kill is associated with a higher severity level than hard errors, memory device "S1" is switched over from being a spare memory device for memory device "A" to being a spare memory device for memory device "C". As part of the switching over, the identifier specifying the location of memory device "S1" is removed from being associated with memory device "B" and applied to memory device "C".

Figure 5:
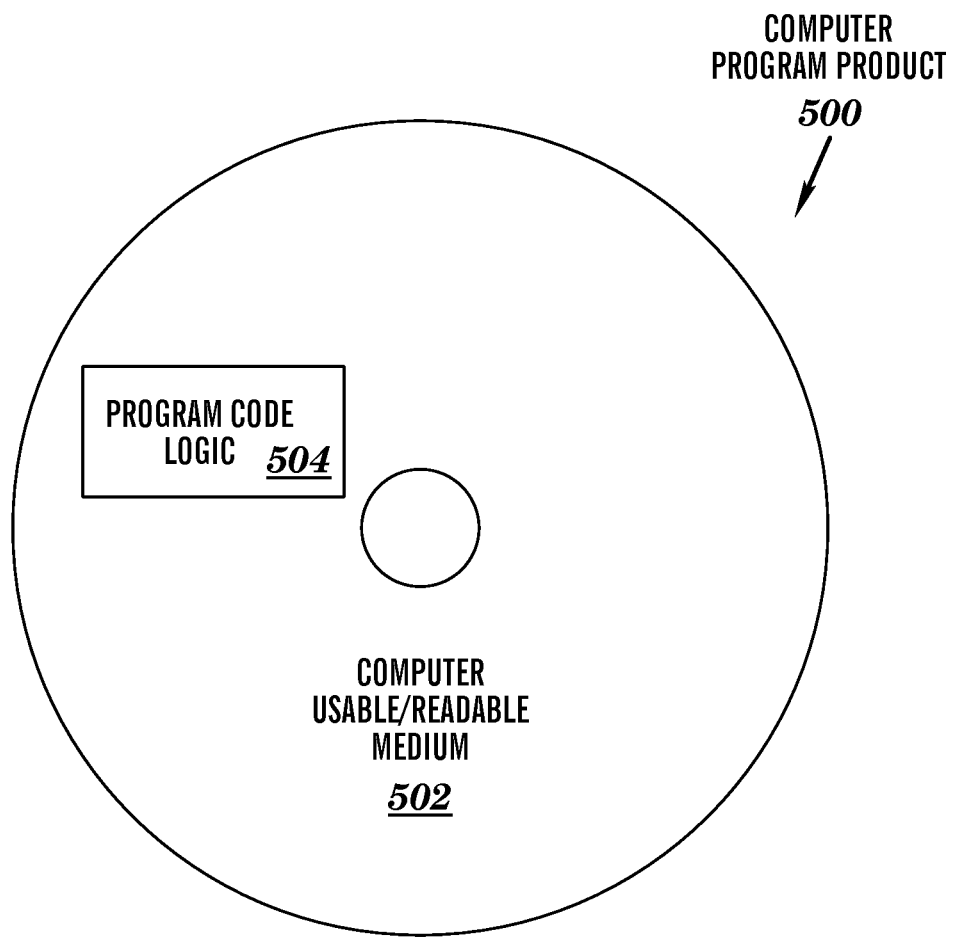
FIG. 5 illustrates a computer program product in accordance with an embodiment.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow.

These claims should be construed to maintain the proper protection for the invention first described.

The invention claimed is:

1. A memory system for providing dynamic graduated chip protection, the memory system comprising:
a plurality of memory devices, the memory system configured to perform a method comprising:
determining a first severity level of a first failing memory device in the plurality of memory devices, the first failing memory device associated with an identifier used to communicate a location of the first failing memory device to an error correction code (ECC);
determining a second severity level of a second failing memory device in the plurality of memory devices;
determining that the second severity level is higher than the first severity level;
removing the identifier from the first failing memory device based on determining that the second severity level is higher than the first severity level; and
applying the identifier to the second failing memory device based on determining that the second severity level is higher than the first severity level.

2. The memory system of claim 1, wherein the identifier is a chip mark and, based on the first failing memory device being associated with the chip mark, the ECC code is configured to ignore all contributing errors associated with the first failing memory device.

3. The memory system of claim 1, wherein the identifier specifies a location of a spare memory device, and, based on the first failing memory device being associated with the spare memory device, the memory system is configured to use the spare memory device in place of the first failing memory device to service a request to read data from the first failing memory device.

4. The memory system of claim 3, further comprising, based on applying the identifier to the second failing memory device, switching the spare memory device from the first failing memory device to the second failing memory device, such that the memory system is configured to use the spare memory device in place of the second failing memory device to service a request to read data from the second failing memory device.

5. The memory system of claim 1, wherein the identifier specifies a location of a spare memory device, and, based on the first failing memory device being associated with the spare memory device, the memory system is configured to write to both the spare memory device and the first failing memory device to service a request to write data to the first failing memory device.

6. The memory system of claim 5, wherein the first rank spans multiple channels in the memory system.

7. The memory system of claim 5, further comprising, based on applying the identifier to the second failing memory device, switching the spare memory device from the first failing memory device to the second failing memory device, and, based on the second failing memory device being associated with the spare memory device, the memory system is configured to write to both the spare memory device and the second failing memory device to service a request to write data to the second failing memory device.

8. The memory system of claim 1, wherein the method further comprises determining a third severity level of a third failing memory device in the plurality of memory devices, the third failing memory device associated with a second identifier used to communicate a second location of a second failing memory device to the ECC.

9. The memory system of claim 8, wherein the third severity level is associated with soft errors.

10. The memory system of claim 1, wherein the memory system is a redundant array of independent memory (RAIM) system.

11. The memory system of claim 1, wherein the plurality of memory devices are in a first rank of the memory system.

12. The memory system of claim 1, wherein the second severity level is associated with a chip kill and the first severity level is associated with hard errors.

13. The memory system of claim 1, further comprising continuing to operate the memory system with the first failing memory device and the second failing memory device after removing the identifier from the first failing memory device and applying the identifier to the second failing memory device.

\* \* \* \* \*